Fig. 1

INVENTOR
*Russell John Dorn*
BY
*Ralph F. Crandell*
ATTORNEY

Sept. 10, 1968  R. J. DORN  3,400,771
MOBILE PERCUSSION UNIT
Filed May 9, 1966  9 Sheets-Sheet 3

INVENTOR
Russell John Dorn
BY
Ralph F. Crandell
ATTORNEY

Fig. 6

Sept. 10, 1968     R. J. DORN     3,400,771
MOBILE PERCUSSION UNIT Filed May 9, 1966     9 Sheets-Sheet 5

INVENTOR
Russell John Dorn
BY
Ralph F. Crandell
ATTORNEY

Fig. 10

Sept. 10, 1968  R. J. DORN  3,400,771
MOBILE PERCUSSION UNIT
Filed May 9, 1966  9 Sheets-Sheet 7

Fig. 10a

INVENTOR
Russell John Dorn
BY
Ralph F. Crandell
ATTORNEY

Fig. 11

United States Patent Office 3,400,771
Patented Sept. 10, 1968

3,400,771
MOBILE PERCUSSION UNIT
Russell John Dorn, Aurora, Colo., assignor to Arrow Manufacturing Company, Denver, Colo., a corporation of Colorado
Filed May 9, 1966, Ser. No. 548,659
13 Claims. (Cl. 173—43)

ABSTRACT OF THE DISCLOSURE

The mobile percussion unit is embodied in a post driver or like apparatus mounted on a vehicle. A carriage assembly is mounted on the vehicle frame and comprises a rigid elongated frame component fixed to the vehicle in a generally horizontal attitude, with separate frame members slidably carried by the frame component for independent extension and retraction longitudinally of the frame component. One of the separate frame members carries a counterweight, while the other frame member carries a hammer tower assembly having a reciprocable hammer supported between parallel rails. The bottom end of the hammer tower is provided with a ground engaging shoe plate for guiding a post while a post guiding follower assembly is mounted between the rails below the hammer.

---

This invention relates to mobile, powered equipment organized and operable to generate and apply repetitious, percussive impulses to various specific purposes, such as the driving to earth-embedment of adjuncts such as posts, stakes, and the like.

The principal object of this invention is to provide a novel and improved post driver of enhanced practicality and efficiency.

Another object of the invention is to provide a unitary, operative correlation of elements and features constituting a fully self-powered, mobile, dirigible and functionally flexible post driver of unique versatility and distinctive advantage.

A further object of the invention is to provide a novel and improved mobile post driver unit, suited for self-translation at highway speeds, with attendant capability of precise operative registration with successive stations of intended use.

Still a further object of the invention is to provide a novel and improved mobile post driver unit that is selectively adjustable to a position for use in order to accommodate desired angular placements of its percussive influence relative to the vertical.

A further object of the invention is to provide a novel and improved mobile post driver unit characterized by enhanced facility of adjustment to a truly vertical path of percussive influence.

A further object of the invention is to provide a novel and improved mobile post driver unit that can be quickly and conveniently placed in operative association and proper alinement with the adjunct to be driven.

A further object of the invention is to provide a novel and improved mobile post driver unit that is facile of separation from an adjunct thereby driven into secure emplacement.

A further object of the invention is to provide a novel and improved mobile post driver unit that is capable of repetitiously delivering massive impacts to an associated adjunct with minimal damage to or deformation of the latter.

A further and more detailed object of the invention is to provide a novel and improved mobile post driver unit that is compact in a sturdy integrated assembly applicable to immediate use at sites and in situations variable as to surface nature, condition, and topography; that is amenable to efficient operative regulation and control from a single station thereon; that functions to conserve time and labor with marked economic advantage; that is susceptible of production in a range of desired sizes, capabilities, and structural particularities of specific utility; and that is rugged, durable and suitable for a long life of arduous use with minimal servicing and maintenance requirements.

With the foregoing and other objects in view, my invention consists in the construction, arrangement, and operative combination of elements and features as hereinafter set forth, pointed out in the appended claims, and illustrated by the accompanying drawings, wherein:

FIGURE 12 is an isometric view similar and supplemental to FIGURE 11 showing the complemental portion of the carriage assembly significant to attainment of the purposes and advantages of the invention.

While a certain illustrative form of the present invention has been shown in the drawings and will be described below in considerable detail, it should be understood that there is no intention to limit the invention to the specific form disclosed. On the contrary, it is my intention to cover all modifications, alternative constructions, equivalents and uses of the present invention falling within the spirit and scope of the appended claims.

Summary

The mobile percussion unit embodying the present invention is mounted on a vehicle incorporating an hydraulic pressure fluid power system. A carriage assembly is mounted on the vehicle frame and includes a fixed frame component defining tracks supporting extensible separate frame members. The frame members are adapted to extend or retract in a direction generally perpendicular to the longitudinal axis of the vehicle. One of the frame members carries a counterweight for purposes of balancing the assembly. The other of the extensible frame members carries a percussion tower assembly. The tower comprises a pair of spaced rails joined intermediate their ends by a U-shaped yoke. The yoke mounts a pintle to provide for swinging movement of the tower about a vertical axis. The pintle is in turn supported on a trunnion journalled in a sleeve to provide for rotation of the tower about a horizontal axis. The sleeve is mounted on the carriage frame member for swinging movement about a horizontal axis generally perpendicular to the trunnion axis. A hammer is reciprocably mounted in the tower. For positioning and guiding a post, there is provided a follower assembly which engages the upper end of the post. The follower assembly is slidably mounted in the tower and can be engaged or disengaged from the hammer. The follower includes a head plate or anvil which is engaged by a striker on the lower end of the hammer. The lower end of the post is guided by a ground engaging shoe plate which is adjustably extensible from the bottom of the tower.

Description of the preferred embodiment

In general

The setting of posts, stakes, and the like, to a moderate upward projection from secure earth-embedment, is an ancient and continuing corollary to a wide range of enterprises. The advent and improvement of mobile power equipment has promoted the practice of percussively sinking post-type facilities where and as desired for use; however, complications attending such practice, such as damage to and deformation of the driven member; delays and frustrations incident to translation and site location of the power equipment with reference to variations of terrain; difficulties involved in the operative association and separation of the equipment from the driven adjunct; and vertical orientation of driver and adjunct, have more than a little restricted the practical advantage of the practice as hitherto achieved. The present invention is hence directed to the provision of novel and improved power equipment operable for the setting of driven adjuncts, such as posts and other members, with substantial avoidance of the inadequacies heretofore manifest, and with consequent enhanced efficiency, economy, and merit of result.

The mobile percussion unit of the present invention is a structurally and synergistically coordinated combination of three principal sub-assemblies identifiable as an automotive vehicle, a percussion tower assembly, and a carriage assembly operatively coupling the tower assembly to the vehicle in an association uniquely subject to selective regulation and control. In the following description, reference will be made principally to posts with the understanding that adjuncts such as stakes, poles and the like are equally contemplated.

The automotive vehicle

The automotive vehicle, designated generally in the drawings by the symbol V, is the translatory and functional support for the associated features of the improved unit. The vehicle shown in the drawings is self-powered for translation and customarily dirigible, and provides power for actuation and operation of the associated features through a conventional hydraulic pressure fluid system. The vehicle V as shown in the drawings is typical of any such facility, conventional or other, having a sturdy frame 20 supported for translation by wheels 21, or tracks, powered through a change-speed train by a prime mover mounted on the frame, steered by means such as a steering wheel 22 adjacent an operator's station 23, and carrying an hydraulic pressure fluid power system, not shown, appropriately powered for supplying pressure fluid to and through flow lines under the regulation and control of an array of selectively-actuable valves 24 positioned conveniently adjacent the operator's station 23. While primarily a mobile, self-propelled mounting and source of actuating power for the associated features of the post driver, the vehicle V is, in and of itself, conventional in concept and organization. The vehicle may be of a commercially-available type and construction, or may be of a distinctive and specialized fabrication, presenting, in either case, the desired properties and capabilities for use in association with the herein described post driver features.

The carriage assembly

Figure 11A:
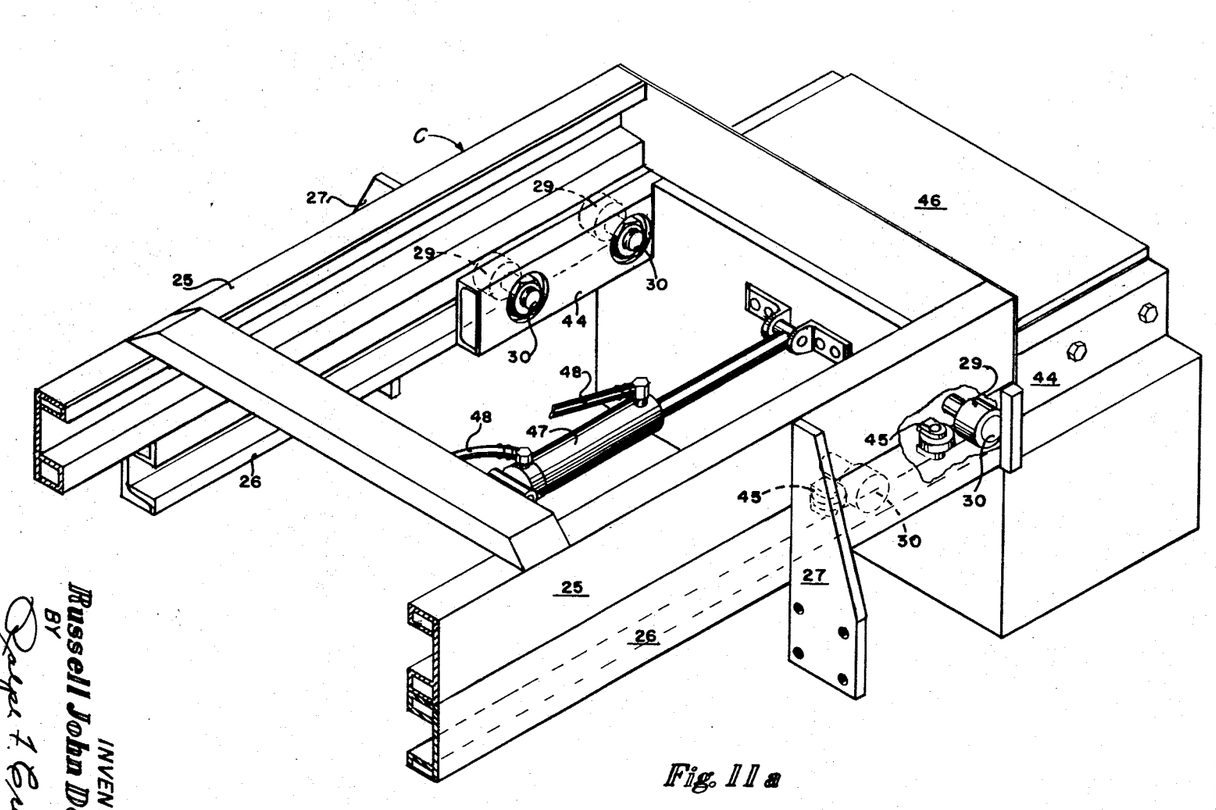
FIGURE 11 is an isometric view of approximately one-half portion of an extensible and retractable carriage assembly effective as represented in certain of the preceding views to operatively associate the percussion tower assembly with an automotive vehicle in accordance with the concept and principles of the invention, certain of the disclosed elements being foreshortened and displaced to conserve space and others thereof being broken away to reveal otherwise concealed relationships.

The carriage assembly, designated generally by the symbol C, is as best shown in FIGURES 11 and 12, an operative correlation of fixed and separate independently relatively extensible and retractable frame components which coact as a unit suitable for mounting upon and in secure attachment with the frame 20 of the vehicle V. The fixed frame component of the carriage C is formed of a size and conformation adapted to overlie and laterally span across the vehicle frame 20, with similar straight, upper and lower channel beams 25 and 26, respectively, (FIGS. 2, 11, and 12) contactingly superposed, with their webs coplanar, to serve as and close the long sides of the frame component. The beams are positioned with their inwardly-opening channels in spaced, parallel confrontation in order to form adjacent upper and lower tracks extending longitudinally of the frame component and being respectively open at opposite ends thereof. Preferably, although not necessarily, arranged to laterally traverse the vehicle frame 20, the stacked beams 25 and 26 are firmly secured by means of brackets 27, to subjacent zones of the vehicle frame 20, so that the channel tracks of the beams are disposed transversely of the frame 20.

Receivable between and in the plane common to the beams 25 of the fixed frame component, there is provided a rigid box structure including straight, spacedly-parallel, members 28, furnished with rollers 29, freely revoluble exteriorly of said members 28 on pins 30 fixedly outstanding in spaced parallel relation from the members. The rollers are received within the channel tracks of the beams 25, and coact therewith to support the box structure characterized by the members 28 on, between, and for reciprocation longitudinally of the beams 25.

In order to selectively reciprocate the box structure relative to the beams 25, power means are provided comprising an hydraulic motor 31 mounted on the beam 26, in driving relation with a shaft 32 extending transversely of and beneath the members 28. The motor is served with pressure fluid through lines 33, under control of a valve 24, from the fluid pressure system of the vehicle V. For driving the members 28, the shaft 32 fixedly carries a sprocket 34 subjacent and in clearing relation with each proximate member 28, and a chain 35 attached near the ends of each said member 28 extends loosely under the members and over spaced idler sprockets 36 whereby it is directed to and held in engagement with the sprocket 34. Rotation of the sprocket 34 by the motor 31 and shaft 32 serves to shift the box structure relative to the vehicle frame 20. The motor 31 being conventionally reversible, selective pressure fluid actuation thereof serves to reciprocate the box structure relative to and in rolling engagement with the beams 25 of the fixed frame component in the direction and to the available extent desired.

Proportioned for corresponding extension from and beyond the adjacent ends of the supporting beams 25, the outwardly-directed ends of the shiftable box structure members 28 carry complementary upstanding parallel pedestals 37 fixed thereon and supporting bearing-type terminals 38. Each terminal 38 receives one end of a generally horizontal shaft 39, which shaft is thereby disposed with its axis paralleling the shift plane of the associated structure and perpendicular to the axis of movement thereof.

For bracing and thereby increasing the rigidity of the shiftable box structure, a strut 40 is mounted parallel to and beneath the shaft 39 to fixedly intercouple the pedestals 37.

The shaft 39, rockable about its axis relative to the supporting terminals 38, serves as an adjustable mount for the percussion tower assembly T, to which end said shaft fixedly carries at its midlength a tower assembly supporting journal sleeve 41 radially offset from and above the shaft in axially-perpendicular relation therewith. For purposes of rocking the shaft 39, there is provided a rock arm 42 fixedly depending generally radially therefrom at one side of the sleeve 41 and between the pedestals 37, which arm 42 terminates well below the shift plane of the members 28. The angular attitude of the arm 42 controls the angular disposition of the associated shaft and sleeve. To this end, the arm 42 is selectively positioned by means of an hydraulic ram 43 operatively connected thereto and lying generally in the plane of the members 28, so as to be disposed between and substantially parallel thereto. At one end, for example the piston end 43a, the ram engages with said arm 42. At its other end the ram 43 engages a fixed element 43b of the shiftable structure. In this arrangement, the ram 43, operative under the influence of the hydraulic pressure fluid system of the vehicle V, by optional extension or retraction, effects the desired rocking of the arm 42, shaft 39, and sleeve 41 in all positions of the fixed frame and shiftable box structure.

The counterweight

The other and separate extensible and retractable component of the carriage assembly C constitutes an extensible counterweight mechanism. Referring to FIG. 12, this counterweight mechanism is there shown as a rigid structure characterized by spaced, parallel members 44, each furnished with spacedly-related rollers 29 operatively carried laterally and outwardly adjacent thereto by pins 30, as previously described. The rollers 29 coact with the tracks defined by the beams 26 in a manner to support the members 44 and the structure carried thereby between and for reciprocation upon said beams 26. Accordingly, the members 44 can be extended at times outwardly from the end of the fixed frame 20 remote from that occupied by the shiftable structure including the members 28. To inhibit possible lateral play of the members 44 as overlapped within the beams 26, it is expedient to provide guide wheels 45, fixed exteriorly of said members for rotation about axes perpendicular to those of the rollers 29, and adapted to track adjacent the latter on the contiguous faces of the webs of the beams 26.

In order to provide a counterweight to balance the weight of the tower assembly T, the outwardly-directed ends of the members 44 fixedly support therebetween a massive counterweight block 46 conformed for retraction with said members inwardly of the proximate end of the fixed frame or for extension with said members outwardly therefrom. Such a counterweight block thus forms a counterbalance effective through the fixed frame to balance weight displacements at the other end thereof. For selectively extending or retracting the weight block 46, an hydraulic ram 47, conventionally and regulably served by the pressure fluid system of the vehicle, through lines 48, operatively connects parallel to and between the members 44 from a point of attachment at one end to an immovable element of the fixed frame 20 to engagement of its other end with the block 46 or an equivalently-shiftable constituent of the associated structure. Thus constituted, the weight block 46 is subject to optional longitudinal extension or retraction relative to the proximate end of the fixed frame and hence laterally of the vehicle V.

The percussion tower assembly

The percussion tower assembly, designated generally by the symbol T, together with the shoe plate and follower assemblies carried thereby qualifies and completes the organization of the present invention for its intended use as a post driver in an operative association with the vehicle V and carriage assembly C.

The elements and features of the tower assembly T are operatively and unitarily correlated with a rigid, elongated guideway comprised, in analogy with the drop frame of a piledriver, as a pair of slide rails 49, desirably angular in cross-section, securely coupled in spaced, parallel, and preferably apex-confronting, relation by a transverse cap 50 spanning in fixed engagement with and between corresponding upper ends of said rails. Intermediate their ends, the rails are joined by a U-shaped yoke 51 and fixed transversely of and across said rails in laterally-offset relation, and a web 52, also U-shaped in substantial conformity with the yoke 51, uniting the rails at a moderate distance inwardly thereof from the said yoke in a relative disposition corresponding with yoke 51. So constituted with the rails 49 being of an expedient length and having an appropriate separation, the guideway serves, in further analogy with pile-driver arrangements, to receive, retain, and reciprocably accommodate a massive hammer 53, edge-conformed to embrace and slide upon the rails 49 between the cap 50 and the open-spaced lower rail ends.

For purposes of supporting the tower assembly T on the carriage assembly C, the web 52 is spaced inwardly along and from the adjacent open ends of the rails 49 a distance less than the elevation of the shaft 39 above the ground support of the vehicle V when the carriage assembly C is associated with the vehicle for use as shown and described (FIG. 11). As so located, the said web 52 is utilized to operatively associate the guideway and its hammer 53 with said carriage assembly and vehicle in the manner and by the means best shown in FIGURE 6. To this end there are affixed to the surface of the web 52 remote from the rails 49, spaced, complementary lugs 54, which outstand perpendicularly therefrom and support of a pintle 55. The pintle 55 is held by and in extension between the lugs so as to be positioned parallel to the rails 49 and equidistant therefrom. A fitting 56 is journaled upon said pintle 55 between and in bearing engagement with said lugs to articulate laterally of the rails 49. The fitting 56 carries a trunnion 57 outstanding therefor oppositely from its journal attachment to the pintle 55 with the trunnion axis radial of said journal attachment. In appropriate size and proportion, said trunnion is received and retained for relative rotation in the journal sleeve 41 upstanding from the shaft 39 of the carriage assembly C whereby, as is readily apparent, the guideway distinguished by the rails 49 is structurally and operatively coupled to the carriage C for travel with the shiftable carriage component mounting the shaft 39. With the foregoing mounting the guideway is susceptible of articulation about the axis of said shaft 39 in a vertical arc perpendicular to said axis, of articulation in a vertical arc parallel to the shaft 39 about the axis of the trunnion 57 engaged in the sleeve 41, and of articulation in a horizontal plane on and about the axis of pintle 55 in upright dispositions of the tower assembly T.

Figure 1:
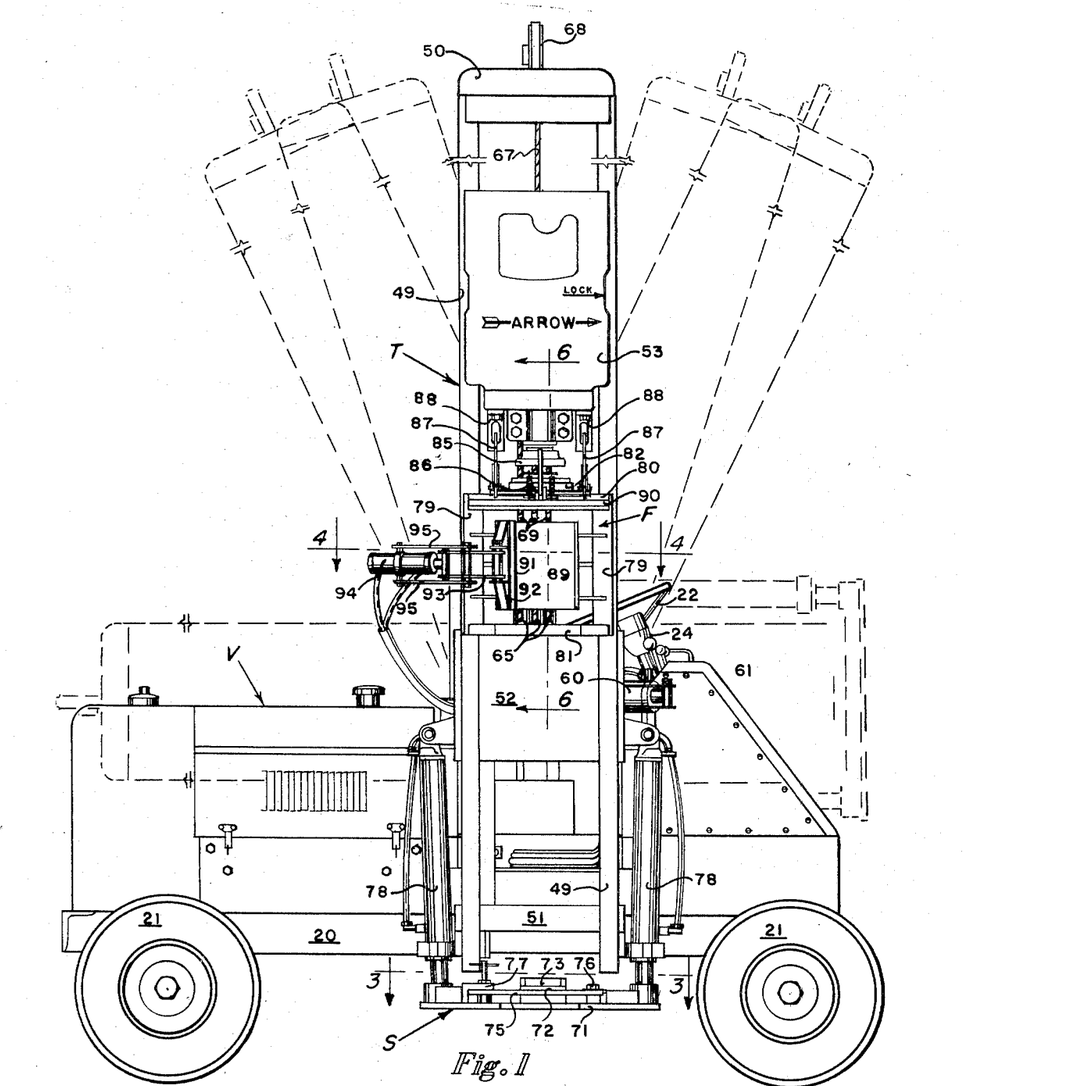
FIGURE 1 is an elevational view of a typical embodiment of the invention as organized and positioned for practical use, certain of the illustrated elements being foreshortened to conserve space, and a range of relative angular adjustment inherent in the assembly being represented by broken lines.

Provision is made for optional regulation and selective adjustment of the so-mounted tower assembly T with respect to each of the three pivotal axes. As previously described, adjustment of tower assembly attitude in a vertical plane perpendicular to the axis of the shaft 39 is controlled by the ram 43 actuable, as above explained, to rock said shaft through the agency of the arm 42 and concomitantly tilt the sleeve 41 carrying the trunnion 57 for consequent angular displacement of the tower assembly through a range exemplified by the broken line supplements to FIGURE 2. Adjustment of tower assembly attitude in a vertical plane parallel to the shaft 39 is independently controlled by an hydraulic ram 58 operatively connected with the pressure fluid system of the vehicle. One end of the ram 58 is coupled to the end of the arm 42 remote from said shaft, while the other end of the ram 58 is joined with a limb 59 fixedly extending perpendicular to the axis of the trunnion 57 from the appropriate side of the fitting 56. Through this arrangement, actuation of the ram 58 serves to rock the trunnion 57 about its axis within the journal sleeve 41 for consequent angular displacement of the tower assembly through a range exemplified by the broken line supplements to FIGURE 1. The tower assembly attitude in the pertinent plane can thus be adjusted through an arc in excess of ninety degrees, embracing a tower assembly disposition parallel to the vehicle frame 20, of practical significance and merit facilitating highway travel of the unit, and a disposition of said tower assembly variable to and beyond perpendicular relation with the plane of said frame 20.

Figure 4:
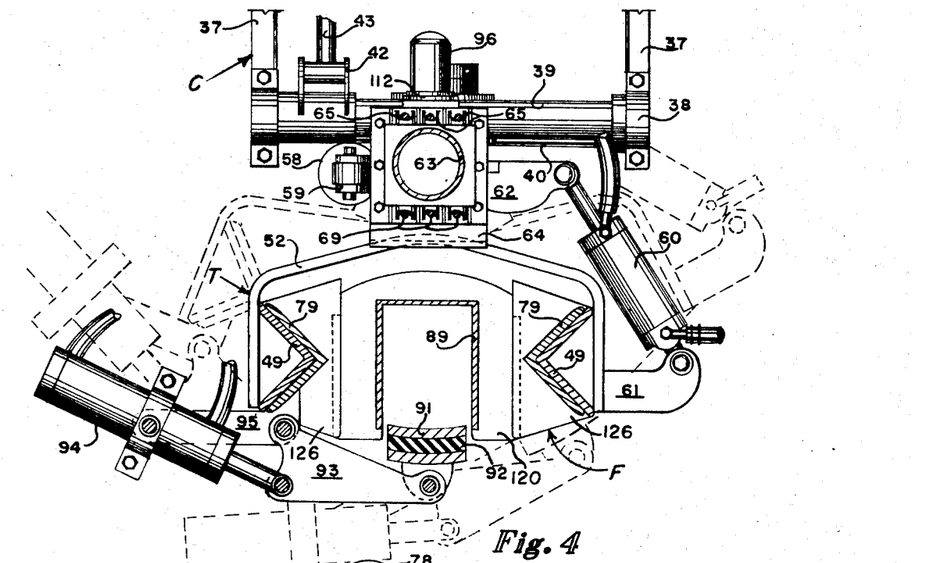
FIGURE 4 is a transverse section, on a relatively-enlarged scale, taken substantially in the plane of the indicated line 4—4 of FIGURE 1, a range of angular adjustment inherent in the assembly being represented by broken lines.
Figure 5:
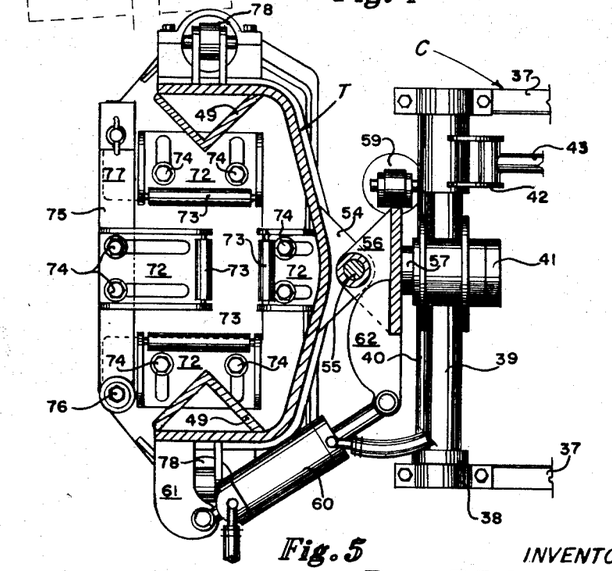
FIGURE 5 is a transverse section on a relatively-enlarged scale taken substantially in the plane of the indicated line 5—5 of FIGURE 2.

Adjustment of tower assembly attitude variable about the pintle 55 is independently controlled by an hydraulic ram 60, operatively connected with the pressure fluid system of the vehicle. The ram 60 is mounted at one end between ears 61 fixedly and laterally outstanding from the web 52, and at its other end between ears 62 fixedly and laterally outstanding from the side of the fitting 56 remote from the limb 59. In this manner actuations of the ram 60 are reflected as oscillations of said web 52 and the associated components of the tower assembly about the axis of the pintle 55 through a range typified by the broken line supplements to FIGURE 4.

Organized as shown and described, the tower assembly T, unitarily characterized by the guideway defined by the rails 49 and the hammer 53 reciprocable therein, is supported for expedient translation and efficient operation on the vehicle V by means of the carriage assembly C, with provision for selective, counterbalanced shift outwardly from and retraction toward the vehicle; for optional variation of attitude between a horizontal disposition appropriate for highway travel and an adjustable upright operative disposition; for independent optional angular adjustment of its operative attitude in a plane transverse of the vehicle; and for independent optional angular adjustment of its operative attitude in a plane substantially parallel to the ground support for the vehicle. The unit is thus manifestly qualified for facility of access to the site of intended use and for ready adaptation to the exigencies of diverse conditions and variable use purposes. Application of hydraulic pressure fluid to a plurality of independent rams as utilized for regulation and control of the options characterizing the improved unit, speeds and simplifies the functions of the operator, eliminates many complications and deficiencies of alternative functional equivalents, and realizes with advantage the inherent capability of hydraulic rams to reliably retain the adjustments thereby controlled at any and all stations within their range of actuation.

*The hammer assembly*

In a structurally expedient and practical arrangement, reciprocation of the hammer 53 for conventional piledriving effect is accomplished, when the tower assembly is in its adjusted, upright use position, by means and through selective control of an hydraulic ram 63 fixedly carried by a shelf 64 attached to the web 52 and outstanding above the pivotal axes of the tower mount. Effectively disposed generally parallel to and spaced from the longitudinal median line of the tower assembly T, the ram 63 operatively intercouples an array of spaced, parallel sheaves 65 adjacent the shelf 64 and a complementary array of like sheaves 66 extensible and retractable with the ram relative to the sheaves 65. A hammer lifting cable or line 67, end attached with respect to the shelf 64, is reeved over and about said sheaves 65, 66, as a plurality of bights 69, and thence over a pulley 68 on the cap 50 into end attachment with the hammer 53. With this arrangement, actuation of the ram 63 effects a proportionally much-increased travel of the hammer 53 in its guideway.

Regulably served by the pressure fluid system of the vehicle V, the ram 63 responds to either manual or automatic control for consequent desired reciprocation of the hammer 53 in the tower assembly T.

When the tower assembly T is positioned parallel to the length of the vehicle V for highway travel, it is desirable to immobilize the hammer 53 relative to its guideway so as to maintain an approximate balance of tower assembly and component weight about the axis of the trunnion 57. To this end, a manually-actuable latch 70, of any appropriate type and construction, is exteriorly applied to one of the rails 49 for coaction through said rail with complementary elements of the hammer 53 as suitably positioned by the ram 63 generally opposite the axes pivotally mounting the tower assembly. The latch 70 is thus qualified as a releasable lock for the hammer, effective at a selected point of practical weight balance to inhibit hammer travel in and relative to the tower assembly.

*The shoe plate assembly*

As a further feature of the invention, means are provided for receiving and retaining the adjunct, such as a post, to be driven in functionally-proper alignment with the percussive influence imposed through the tower assembly T and hammer 53, and for application of such influence with minimal damage to or deformation of the post.

Operatively and structurally associated with the tower assembly T for adjustment thereon and therewith, such means are embodied, in one illustrative form, in a shoe plate assembly, designated generally by the symbol S, adapted to locate, position, and guide the entering end of the post to be driven, and in a follower assembly, designated generally by the symbol F, adapted to hold, position, guide, and protectively cushion against impact the driven end of the associated post.

Figures 2, 3:
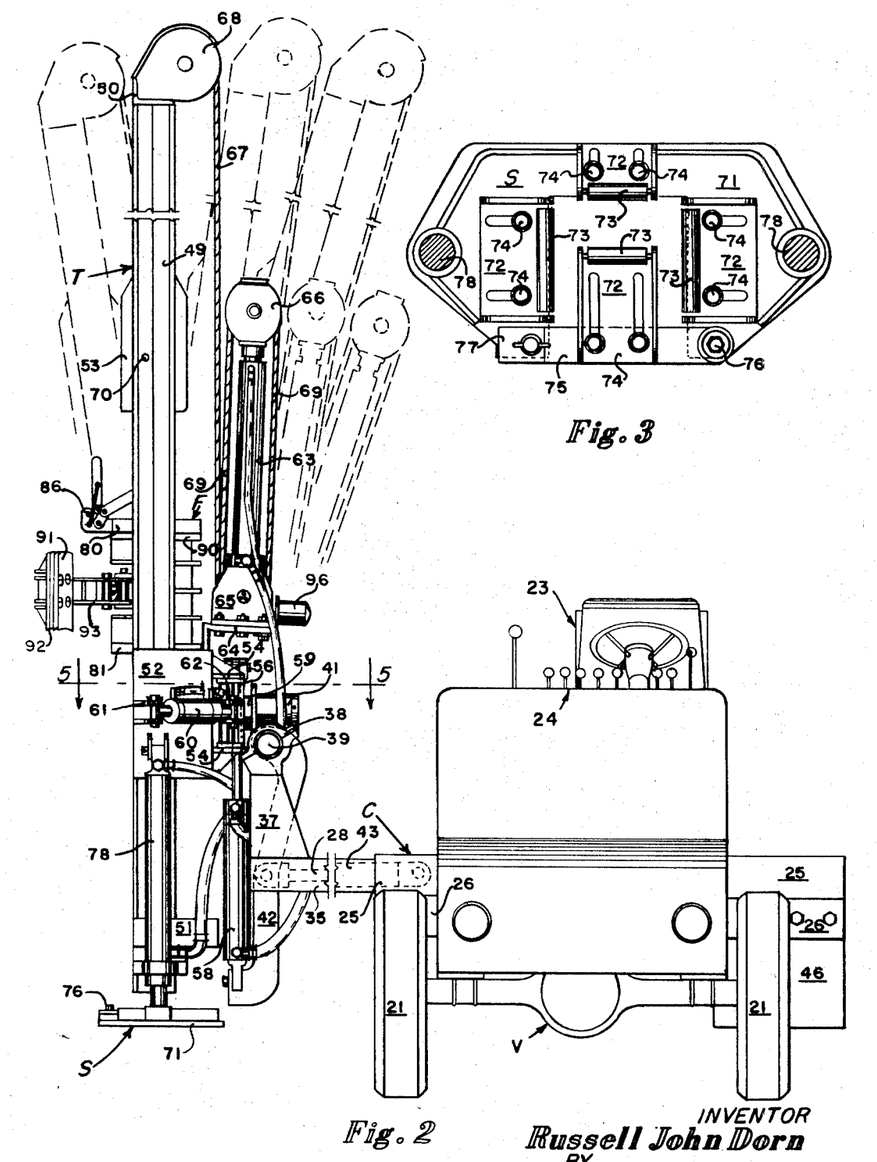
FIGURE 2 is an elevational view of the organization according to FIGURE 1 as viewed perpendicular to and from the right of the latter figure as shown, certain of the elements again being broken away to conserve space and a second range of relative angular adjustment inherent in the assembly being represented by broken lines.
FIGURE 3 is a transverse section, on a relatively-enlarged scale, taken substantially in the plane of the indicated line 3—3 of FIGURE 1.
Figure 2:
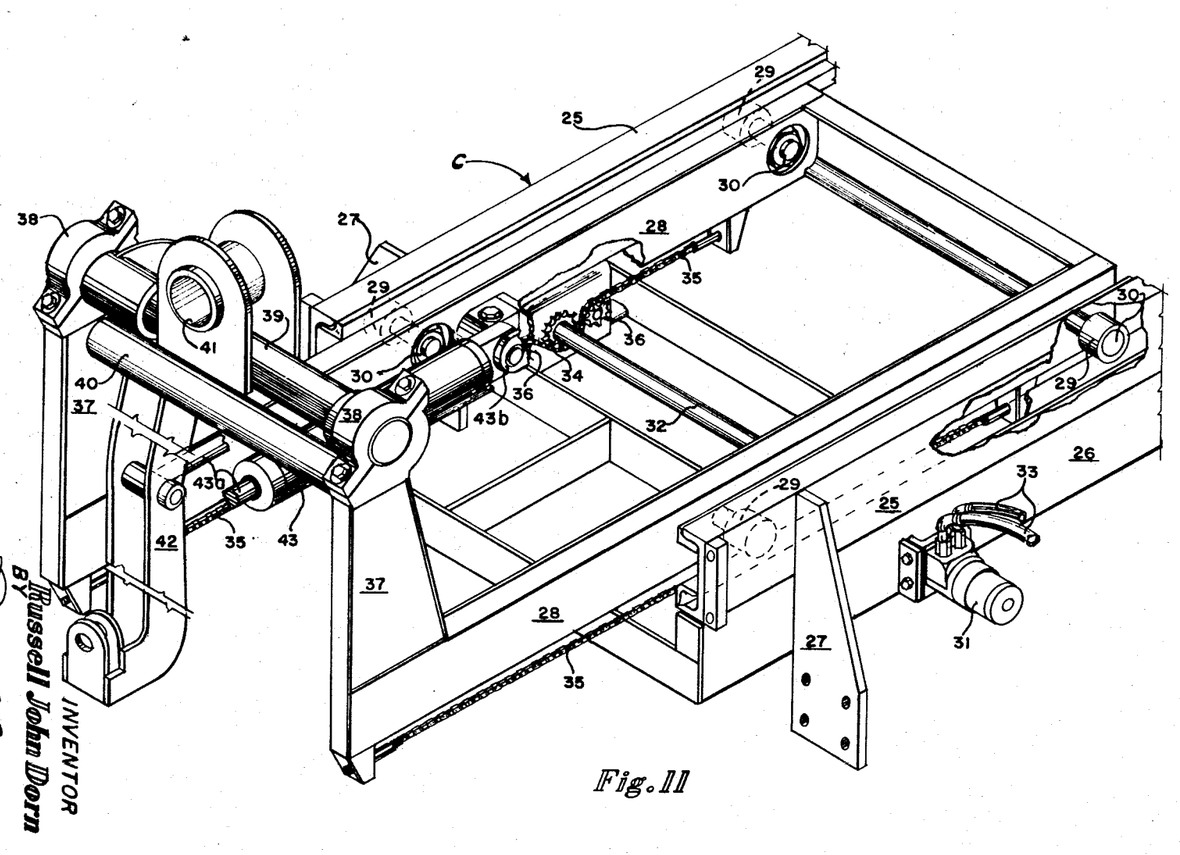

Best detailed in FIGURE 3, the shoe plate assembly S is a unitary correlation of elements on and with a flat, rigid, plate 71, formed in a length exceeding the width of the guideway comprised from the rails 49, and of a width approximately half of its length. For receiving the adjunct, such as a wooden post which is rectangular in cross section, the plate is formed with a central, feasibly rectangular, aperture of considerable extent, which opens through one long side margin of the plate. Slides 72 correspondingly carry rollers 73 freely rotatable thereon in overhanging relation with one margin of the slide and are alike independently attached for adjustment, as by means of studs 74 threadedly engaging the underlying plate 71 through elongated slots in each of the slides 72, which slots are generally perpendicular to the rollers 73. One slide and roller is associated with the plate 71 at each closed side of the plate central aperture in such arrangement as to align the roller 73 of each slide 72 with the subjacent margin of the plate aperture, and to dispose the slots of the slide in engagement with the studs 74 and in a direction perpendicular to the proximate aperture margin. Through manipulation of the studs 74 the several rollers 73 can be adjusted inwardly and outwardly of the plate to define a post receiving and guiding aperture of selected size and configuration.

For closing the plate aperture, there is provided a gate 75, which spans in closing relation across the open side of the plate central aperture. At one end the gate 75 is pivotally connected, as at 76, with the interrupted long side of the plate 71. At its other end, the gate is releasably secured to the plate by a latch clip 77 carried by the plate at the other side of the aperture. A fourth slide 72, functionally identical with and structurally analogous to those previously described, is adjustably attached to the span reach of said gate with its roller 73 parallel to the length of the gate in variable projection inwardly and over the central aperture of the plate 71 when the gate is latched in closing relation across the open side of said aperture.

Figure 10:
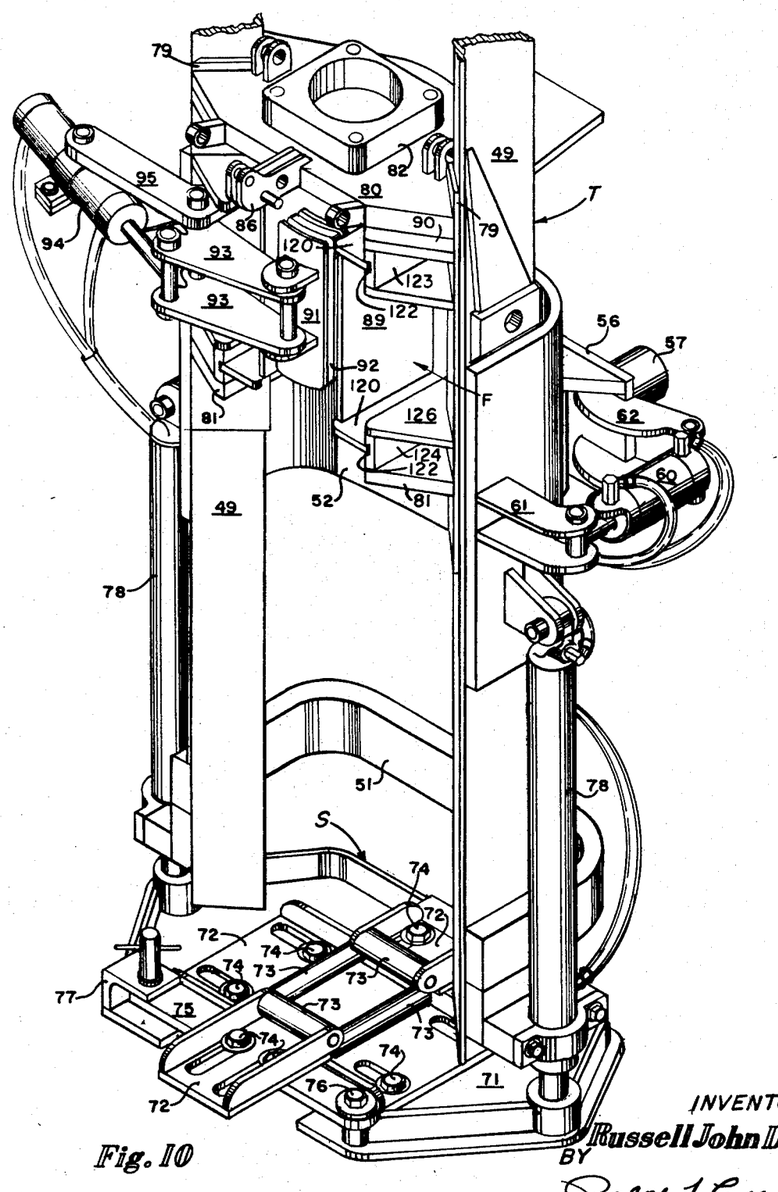
FIGURE 10 is an isometric view, on a relatively-enlarged scale, of the lower portion of the percussion tower assembly shown in FIGURES 1 and 2 as partially stripped for enhanced clarity of illustration.

As so constituted, the shoe plate assembly S is adjustably mounted in association with the tower assembly T by a pair of like, hydraulic rams 78 which are regulably served by the pressure fluid system of the vehicle V. The rams are similarly attached, respectively, in alignment with and to exteriorly overlie the spaced end portions of the rails 49 establishing the open end of the guideway, and are correspondingly connected, as clearly shown by FIGURES 1, 2 and 10, at the available ends of their shiftable components with opposite ends of the plate 71. With this construction, the plate is adjustably disposed transversely of the tower assembly across and in a spacing outwardly from the open end of the guideway determined by the rails 49, with the open side of the plate central aperture and the gate 75 offset to the side of the tower assembly remote from the pivotal support of the latter. The rams 78 are available to selectively vary the attitude and spacing of the shoe plate assembly S relative to the open end of the tower assembly guideway. In the upright use position of the tower assembly, the rams 78 are extended to lower the plate 71 into a firm seating engagement on the subjacent ground surface to steady, stabilize, maintain, and contribute to the support of the tower assembly in registration with the point at which a post is to be driven. After the post is embedded in place the rams 78 are retracted to lift the plate 71.

The adjustable attachment of the slides 72 to the plate 71 permits a correlation of the rollers 73 suited to loosely embrace, position, and guide a post through the central aperture of the plate. The provision of the swingable gate 75 as a closure for the open side of the plate aperture facilitates operative association of the shoe plate assembly S with the adjunct to be driven, and separation of said assembly from the post upon completion of its embedment. It will be appreciated that posts and other adjuncts having a variety of cross sections may be guided by the shoe plate assembly S.

For example, where the adjunct has a curved surface, the rollers will engage tangentially therewith. As pointed out above, the slides and rollers may be readily adjusted to accommodate shoe plate assembly to the adjunct being driven.

*The follower assembly*

For positioning and guiding an adjunct such as a post in driven relation with the hammer assembly, and for minimizing the shock attendant with such driving without materially lessening the driving force, there is provided a follower assembly F unitarily developed in association with a rigid, rectangular traveller and mounted within the tower assembly T below the hammer assembly therein. To this end, there is provided a traveller comprising like transversely-angular slides 79, conjoined in spaced, parallel opposition for reciprocable coaction with the rails 49 of the tower assembly T by a head plate 80 positioned perpendicularly between corresponding ends thereof and supported by a brace plate 81 spacedly parallel to said head plate 80. The traveller is disposed to shift freely in and longitudinally of the guideway of the tower assembly T between the position of the hammer 53 and the open end of said guideway, and is retained in the tower solely by the coaction of the slides 79 and rails 49.

In order to receive and transmit the impacts of the hammer 53, the head plate 80 is appropriately sturdy in an adequate lateral expanse and thickness, and removably and replaceably mounts in a centrally-disposed retainer 82, an anvil 83 is backed by a cushion 84 of stiffly-resilient material such as sixty durometer rubber. For engaging the anvil 83, the hammer carries a striker 85, removably and replaceably affixed in projection from the lower end thereof.

Figure 10A:
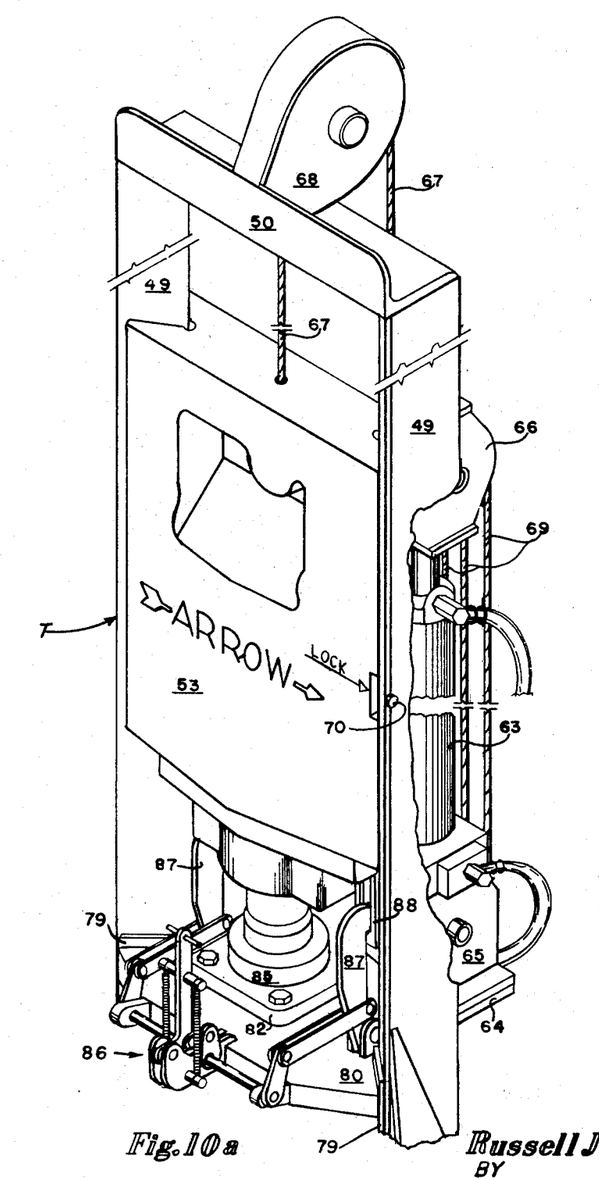
FIGURE 10a is an isometric view similar to FIGURE 10 of the upper portion of the percussion tower assembly as organized in one correlation of its functional features, certain of the illustrated elements being foreshortened to conserve space.

Selective shifting and positioning of the follower assembly F, relative to the guideway of the tower assembly is had by releasably linking the follower assembly F to the hammer 53. One form of linkage is shown in FIG. 10a and comprises a manually-actuable linkage, designated generally by the numeral 86. The illustrative manually-actuable linkage is carried by the head plate 80 and is operable to rock hooks 87 on their pivotal connections to said head plate into latching engagement with slotted keepers 88 fixed to the hammer 53, to couple the follower assembly F to and for travel with the hammer 53 as actuated by the ram 63.

Adapting the follower assembly F as a guide and retainer for the driven end of an adjunct exposed to the percussive influence of the tower assembly T, the assembly includes a sleeve fixture 89 open at both ends and one side, and removeably supported by and between the slides 79 and plates 80 and 81 in centered alignment therewith and with the hammer striker 65 and anvil 83. The open side of the sleeve fixture 89 is directed laterally and outwardly of the tower assembly, for receiving the end of a post to be driven.

For minimizing shock to the sleeve fixture 89 and its supports, there is provided between the head plate 80 and the sleeve fixture supports and slides 79, a cushioning underlay 90 of stiffly-resilient material which may be the same as or similar to that used for the anvil cushion 84. This underlay 90 is interposed contiguous to said head plate in an effective structural association to absorb shocks and vibrations upon impact between the striker 85 and the anvil 83. Consistent with the functions and utility of the sleeve fixture 89, the brace plate 81 is conformed to pass in loose and free relation, a post extending between said sleeve fixture and the shoe plate assembly S, and the structural elements underlying the head plate 80 are equivalently conformed to expose a central under-area of the head plate to direct engagement with the driven end of the associated post.

Completing the organization of the follower assembly F, a selectively-actuable closure or clamping plate for the open side of the sleeve fixture 89 is supplied in the form of a member 91 sized and shaped to at times enter through said open side of the fixture and preferably cushioned, as at 92. The member 91 is pivotally and operatively carried by a linkage 93, supported by the fixed structural elements of the follower assembly F, to swing laterally of the tower assembly T between entering and closing engagement within the sleeve fixture 89, and alternative full-open, clearing relation with the open side of said fixture. Power means are provided for opening and closing the member 91, one illustrative means constituting an hydraulic ram 94 regulably served by the pressure fluid system of the vehicle V. The ram 94 is attached by brackets 95 to the slides 79 of the assembly F and is connected at its piston end with the linkage 93.

The sleeve fixture 89 is desirably removable so that its size and shape may be readily changed to accommodate the follower assembly and the shape of the post being driven. Accordingly, the sleeve fixture is provided with exterior spaced supporting flanges 120 extending rigidly outwardly from its upper lower edges and adapted to be received in corresponding channels 122 defined in spaced supporting walls 123, 124 secured respectively to the head plate 80 and brace plate 81 and braced to the adjacent slides 79 by intermediate brace panels 125 and 126.

Operation

In an illustrative post-driving operation, for example, the follower assembly F is linked, through the agency of the hooks 87 and keepers 88, to the hammer 53 for positioning relative to the tower assembly T during all non-percussive dispositions of the latter, in which situations it is practical that the member 91 be held in closing coaction with the fixture 89. Following registration of the tower assembly T in an upright position over the site at which a post is to be driven, the ram 63 is actuated to elevate the coupled hammer 53 and the follower assembly F sufficiently to fully clear the length of the post. The ram 94 is then actuated to swing the member 91 away from the open side of the fixture 89, and the lower end of the post is placed between and past the rollers 73 of the shoe plate assembly S to rest on the ground. The upper end of the so-positioned post is swung inwardly within the sleeve fixture 89, and the ram 94 is actuated to close the member 91 over the open side of the fixture 89 to retain the post end within the fixture. The ram 63 is then actuated to lower the inter-coupled hammer 53 and follower assembly F so that the under surface of the head plate 80 rests on the upper end of the post. When the post is in place, the connection coupling the follower assembly F to the hammer is released to free said assembly, which is then supported upon the upper end of the post in its guided coaction with the tower assembly T. By raising and dropping the hammer, incident to actuation of the ram 63, driving impacts are delivered to the anvil 83 by the hammer 53 and transmitted to the contained upper end of the post. The follower F, by maintaining the post in cushioned alignment with the tower, protects the post from damage and deformation as a result of the hammer blows thereon.

Upon completion of the driving operation, the driven post is readily separated from the equipment by lowering the hammer 53 to rest on the anvil 83, recoupling the follower assembly F to the hammer, and elevating the latter to retract the follower assembly upwardly and away from the driven post; with or without adjustment of the member 91 relative to the fixture 89. The shoe plate assembly S is elevated from its contact with the ground, and the gate 75 is unlatched to clear the side opening of the central aperture in the plate 71. The motor 31 is actuated to shift the carriage component supporting the tower assembly inwardly toward the vehicle V thereby clearing all the tower assembly features and elements from physical or functional association with the emplaced post. The unit is then conditioned and readied for translation, adjustments, and repetitious use.

The plumb indicator

Figure 7:
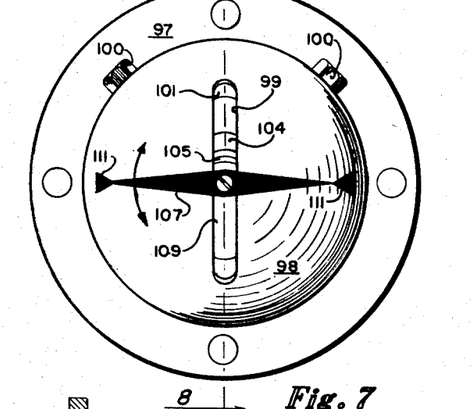
FIGURE 7 is an elevational view of the exterior end of a plumb indicator useful as a determinant of verticality in the association with adjustable features of the improvement signified by FIGURES 2, 4 and 6.
Figure 8:
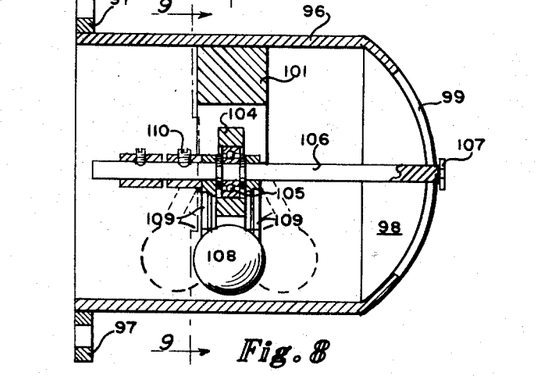
FIGURE 8 is a section taken axially through and substantially on the indicated line 8—8 of FIGURE 7.
Figure 9:
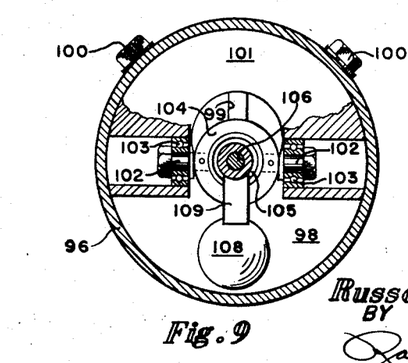
FIGURE 9 is a section taken transversely through and substantially on the indicated line 9—9 of FIGURE 8.

When utilizing the mobile percussion unit, particularly on uneven terrain, it is desirable to have an indication of verticality or plumb of the hammer tower. To this end, there has been provided a plumb indicator finding particular, but not necessarily exclusive, use in association with the mobile percussion unit as exemplified in the drawings herein. One illustrative embodiment of such a plumb indicator embodying certain features of the present invention is shown in FIGS. 7, 8 and 9.

In any expedient particularity of construction, the plumb indicator as shown, unitarily comprises a tubular casing 96 having one open end formed with an exterior radial flange 97 and an opposite domed end closure 98 partially traversed by a diametric slot 99. Fixed within and diametrically of the casing 96, as by bolts 100, an arcuate web 101 supports opposed bearings 103 journaling coaligned trunnions 102 outstanding radially and oppositely from an annulus support member 104. The annulus support member 104 is thereby in nominal concentric relation with the casing 96 to rock on an axis diametric of the casing. The annulus 104 carries in turn a bearing 105 coaxially journaling a shaft 106 freely rotatable therein and extending oppositely therebeyond to protrude at one end through the slot 99, mounted in the outwardly extending end of the shaft 106 exterior of the domed closure 98 is a doubled pointer 107. A pendulum 108, of considerable relative mass, is suspended from the shaft 106 by a yoke 109 extending radially of the shaft and embracing the annulus 104 so that the pendulum 108 swings freely within the casing 96 under the influence of gravity. The yoke 109 carrying the pendulum 108 is clamped to the shaft 106 by a setscrew 110, or the equivalent, to relate and hold the pointer 107 perpendicular to the radial correlation of the pendulum with the shaft. With this construction, displacement of the pendulum transversely and arcuately of the casing 96 is reflected as a corresponding rotational displacement of the shaft and pointer, which displacement is manifest exteriorly of the domed end of the casing as an angular rotation of the pointer about its center. Displacement of the pendulum longitudinally and arcuately of the casing 96 is reflected as a corresponding angular displacement of the annulus 104 about the axes of its trunnions 102 with consequent tilt of the shaft axis accommodated in the slot 99, which displacement is manifest exteriorly of the casing as a vertical shift of the pointer 107 relative to the proximate casing end.

Figure 6:
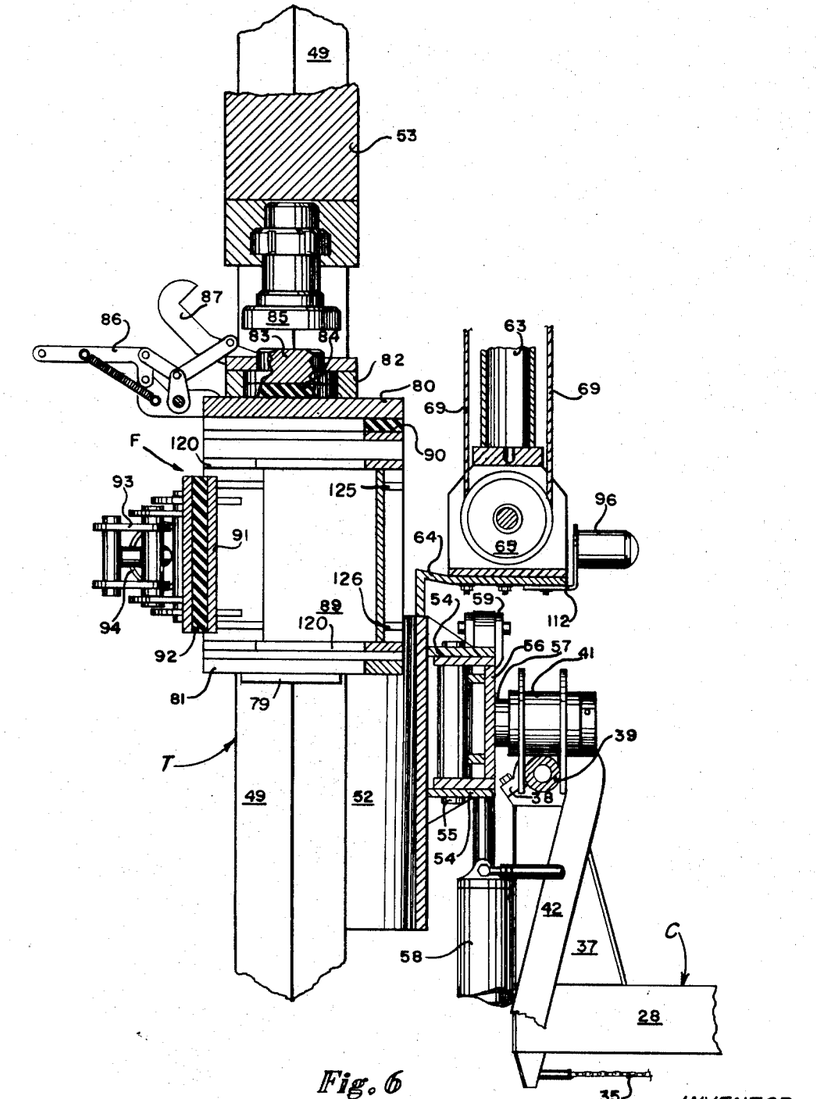
FIGURE 6 is a fragmentary, vertical section taken on a relatively-enlarged scale through and substantially on the indicated line 6—6 of FIGURE 1.

Organized as described, the indicator evidenced true verticality when the coincident axes of the casing 96 and shaft 106 are precisely horizontal and the slot 99 is precisely vertical with the pointer 107 perpendicular thereto. Visual confirmation of such true verticality results when the ends of the pointer 107 register with indicia 111 marking the ends of a true diameter perpendicular to the slot 99 on the domed end of the casing. Any deviation from the true vertical, resulting in angular twist of the pointer relative to the indicia 111, or vertical bodily shift of the pointer away from the line established by said indicia, can be immediately recognized. Operable as set forth, the plumb indicator is associated for practical use with any structural feature or device in which deviation from the vertical is material, by attachment of the casing 96 by means of its flange 97, to the selected device such as a post driver as described above, with the axis of the casing centered upon and perpendicular to the significant line of verticality peculiar to the device and the direction of the slot 99 parallel to said line. Such practical association of the plumb indicator with the mobile percussion unit of the present invention is afforded when, as shown in FIG. 6, the flange 97 of the indicator is attached to a mounting bracket 112 carried by the shelf 64 mounting the ram 63, in such a manner as to functionally correlate the determinate elements of the indicator with the longitudinal median line of the tower assembly T in upright position of use. When so mounted, the plumb indicator affords to the unit operator a reliable visual check of tower assembly verticality.

Thus illustrated and fully described as to organization, operation, practicality and advantage, the mobile percussion unit of the invention is a modern tool, unique in concept, distinctive both structurally and functionally, of high utility, and of exceptional practical merit.

Since changes, variations, and modifications in the construction, form, and arrangement of the elements and features shown and described may be had without departing from the spirit of my invention, I wish to be understood as being limited solely by the scope of the appended claims, rather than by any details of the illustrative showing and foregoing description.

I claim as my invention:

1. A mobile percussion unit comprising, in combination, a dirigible automotive vehicle, a carriage assembly translatably associated with said vehicle and comprising a rigid, elongated frame component fixed to said vehicle in a generally horizontal attitude, and separate frame members slidably carried by said frame component for independent extension and retraction longitudinally and through the respective ends thereof, a percussion tower assembly characterized by a reciprocable hammer and supported by said carriage for adjustment about multiple perpendicularly related axes, means manipulable in mounted association with said tower assembly for correlating the percussive influence of said assembly with a driveable workpiece subject thereto, a pressure fluid system, and fluid pressure means regulably served by the pressure fluid system selectively actuable to vary and determine disposition, attitude and action of the moveable components of the unit.

2. A mobile percussion unit as defined in claim 1 wherein said vehicle includes a generally-horizontal main frame, and said carriage frame component is mounted on said vehicle main frame, said carriage frame component having parallel dual tracks extending longitudinally thereof and transversely of said vehicle main frame, and said separate frame members are slidably carried by said tracks for independent extension and retraction longitudinally and oppositely through the ends thereof, and and said fluid pressure means include means regulably served by the pressure fluid system selectively actuable to vary and determine the reciprocatory correlation of each said separate frame member with its supporting track.

3. A mobile percussion unit as defined in claim 1 wherein said vehicle includes a generally-horizontal main frame, and said carriage frame component is mounted on said vehicle main frame, said carriage frame component having parallel dual tracks extending longitudinally thereof and transversely of said vehicle main frame, and said separate frame members are slidably carried by said tracks for independent extension and retraction longitudinally and oppositely through the ends thereof, means on the outwardly-directed end of one of said separate frame members for supporting the tower assembly, counterweight means on the outwardly-directed end of the other of said separate frame members, and said fluid pressure means includes means regulably served by the pressure fluid system selectively actuable to vary and determine the reciprocatory correlation of each said separate frame member with its supporting track.

4. A mobile pecussion unit as defined in claim 1 wherein said vehicle includes a generally-horizontal main frame, and said carriage frame component is mounted on said vehicle main frame, said carriage frame component having parallel dual tracks extending longitudinally thereof and transversely of said vehicle main frame, and said separate frame members are slidably carried by said tracks for independent extension and retraction longitudinally and oppositely through the ends thereof, means on the outwardly-directed end of one of said separate frame members for supporting the tower assembly, counterweight means on the outwardly-directed end of the other of said separate frame members, a reversible hydraulic motor regulably served by the pressure fluid system of the vehicle mounted on the carriage frame component and operatively connected to the separate frame member mounting the tower assembly supporting means for selective actuation effective to vary and determine the reciprocatory correlation of said tower assembly supporting member with its supporting track, and said fluid pressure means includes means regulably served by the pressure fluid system operatively intercoupling the carriage frame component and the separate frame member carrying the counterweight means for selective actuation effective to vary and determine the reciprocatory correlation of the counterweight supporting frame member with its supporting track.

5. A mobile percussion unit as defined in claim 1 wherein said carriage frame component is formed by track-defining, superposed channel beams paired in spacedly-parallel, confronting relation, means mounting said carriage frame component in a generally horizontal attitude on said vehicle, separate frame members furnished with laterally-exterior rollers thereby shiftably associated with the dual tracks of the channel beams for independent extension and retraction longitudinally and through opposite ends thereof, and said fluid pressure means includes means regulably served by the pressure fluid system selectively actuable to vary and determine the reciprocatory correlation of each said separate frame members with its supporting track.

6. A mobile percussion unit as defined in claim 1 wherein said carriage assembly mounts a rock-shaft for oscillation about a generally-horizontal axis, a trunnion is journalled in axially-perpendicular attachment to said rock-shaft, said tower assembly is hinged to said trunnion for relative articulation on an axis perpendicular to that of the trunnion and parallel to the length of the tower, and said fluid pressure means include means for selectively varying and determining the relative angular adjustment of the tower assembly about each of said rock-shaft, trunnion, and hinge axes.

7. A mobile percussion unit as defined in claim 1 wherein one of said carriage frame members mounts a rock-shaft for oscillation about a generally-horizontal axis perpendicular to the shift path of the member, a trunnion is journalled in axially-perpendicular attachment to said rock-shaft, said tower assembly is hinged to said trunnion for relative articulation on an axis perpendicular to that of the trunnion and parallel to the length of the tower, and said fluid pressure means includes independent means regulably served by the pressure fluid system operatively coupling members associated for relative angular adjustment about each of said rock-shaft, trunnion, and hinge axes and operatively coupling members significant to relative shift of said frame member for selective actuation effective to vary and determine linear displacement of said tower and axes relative to the vehicle and angular displacement of said tower and axes relative to the vehicle and angular displacement of the tower about said axes.

8. A mobile percussion unit as defined in claim 1 wherein said tower assembly includes spaced, parallel rails joined intermediate their ends by a transverse web and one of said carriage frame members mounts at one end thereof means for adjustably mounting said tower assembly comprising a rock-shaft carried by the frame member for oscillation about a generally-horizontal axis perpendicular to the shift path of the frame member, a trunnion journalled on said rock-shaft in axially-perpendicular relation thereto, and a hinge means connecting said tower web to said trunnion for swinging movement about an axis perpendicular to that of the trunnion and parallel to the rails yoked by said web, and said fluid pressure means includes independent means regulably served by the pressure fluid system selectively actuable to vary and determine linear displacement of the frame member relative to the vehicle and angular displacements about the axis of each said rock-shaft, trunnion, and hinge means.

9. A mobile percussion unit as defined in claim 1 wherein said percussion tower assembly is an elongated structure characterized by a guideway having complementary spaced, parallel rails joined at one end by a transverse terminal cap and laterally-offset web, said guideway being open at its end remote from the cap, a hammer reciprocable in said guideway, means carried by said web and regulably served by the pressure fluid system for effecting reciprocation of said hammer, a transverse shoe plate assembly adjustable longitudinally of the guideway at the open end thereof, a follower assembly independently reciprocable in said guideway subject to the influence of said hammer, and attachment means on said web for adjustably supporting said tower assembly on said carriage assembly.

10. A mobile percussion unit as defined in claim 1 wherein said percussion tower assembly is an elongated structure characterized by a guideway having complementary spaced, parallel rails joined at one end by a transverse terminal cap and joined intermediate their ends by a transverse, laterally-offset web, said guideway being open at its end remote from the cap, a hammer reciprocable in said guideway, means carried by said web and regulably served by the pressure fluid system for effecting reciprocation of said hammer, a shoe plate assembly outwardly spaced from and transversely opposing the open end of the guideway, complementary pressure fluid means regulably served by the pressure fluid system operatively coupling said shoe plate assembly to the guideway rails for selective displacement of the shoe plate assembly longitudinally relative to the guideway, a follower assembly independently reciprocable in said guideway subject to the influence of said hammer, and attachment means on said web for adjustably supporting said tower assembly on said carriage assembly.

11. A mobile percussion unit as defined in claim 10 including means for releasably latching said follower assembly to and for travel with said hammer.

12. A mobile percussion unit as defined in claim 10 including means adapting said shoe plate assembly and said follower assembly for guiding and retaining coaction with a driveable workpiece so as to align the same in position for driving engagement by said hammer.

13. A mobile percussion unit as defined in claim 10 wherein said shoe plate assembly includes means for engaging, locating, guiding and retaining one end of a driveable workpiece, and said follower assembly includes impact cushioning means adapted to engage, locate, guide and retain the end of the driveable workpiece remote from the end engaged by said shoe plate assembly.

References Cited
UNITED STATES PATENTS

| | | | |
|---|---|---|---|
| 722,985 | 3/1903 | Inggoldsby | 173—43 |
| 2,295,489 | 9/1942 | Reimenschneider | 173—131 |
| 2,352,758 | 7/1944 | Bauknecht | 33—215.2 |
| 2,655,006 | 10/1953 | Hoen et al. | 173—20 X |
| 3,172,483 | 3/1965 | Spitzer | 173—43 |

ERNEST R. PURSER, *Primary Examiner.*